Figure 1:
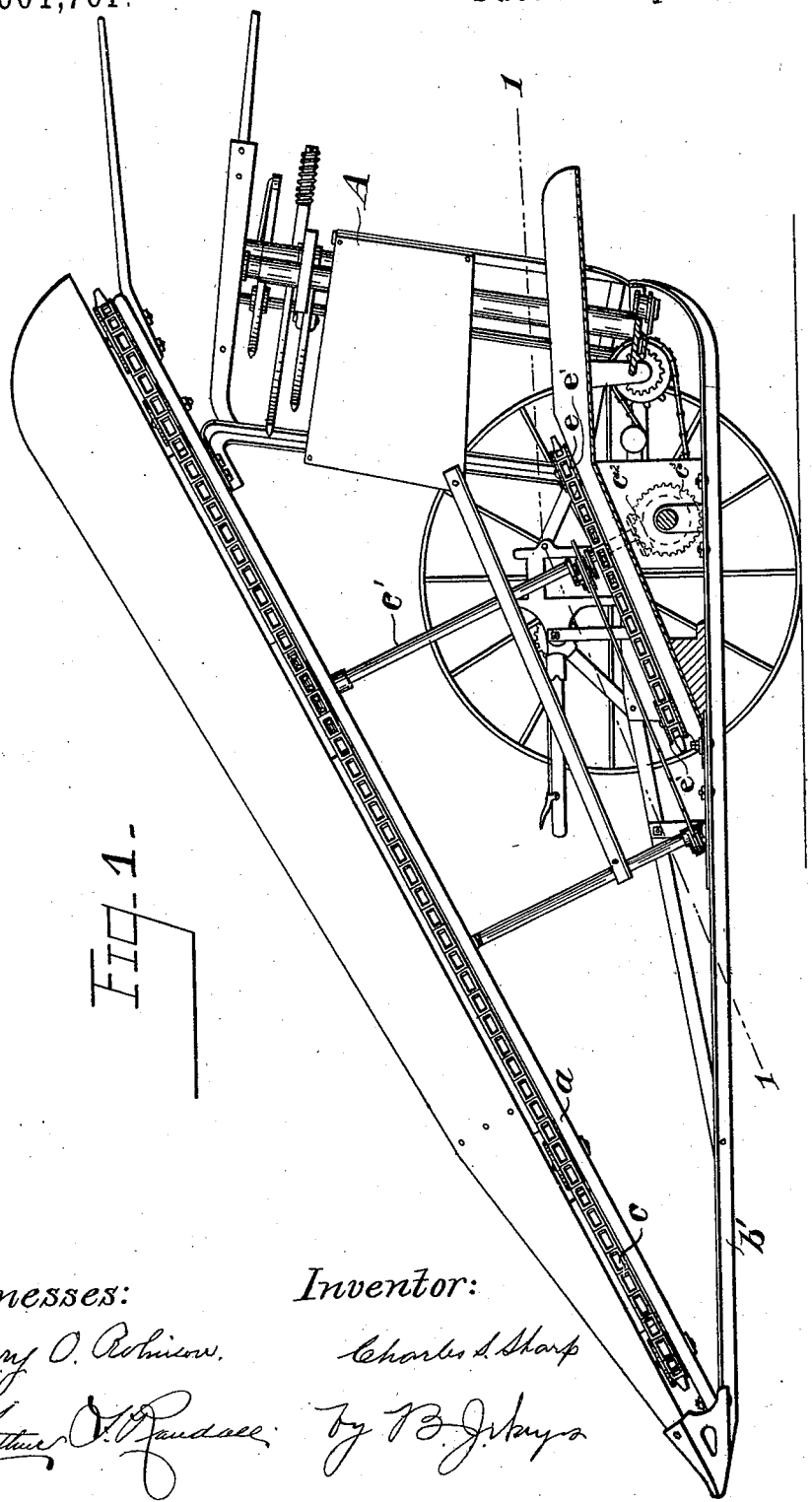

(No Model.) 2 Sheets—Sheet 2.

C. S. SHARP.
CORN HARVESTER.

No. 601,761. Patented Apr. 5, 1898.

Witnesses:

Inventor:
Charles S. Sharp
Attorney.

UNITED STATES PATENT OFFICE.

CHARLES S. SHARP, OF AUBURN, NEW YORK, ASSIGNOR TO THE D. M. OSBORNE & COMPANY, OF SAME PLACE.

CORN-HARVESTER.

SPECIFICATION forming part of Letters Patent No. 601,761, dated April 5, 1898.

Application filed March 15, 1897. Renewed January 20, 1898. Serial No. 667,356. (No model.)

*To all whom it may concern:*

Be it known that I, CHARLES S. SHARP, of Auburn, county of Cayuga, and State of New York, have invented an Improvement in Corn-Harvesters, of which the following description, in connection with the accompanying drawings, is a specification, like letters on the drawings representing like parts.

In corn-harvesters—such, for instance, as shown in United States Patent No. 539,830—the standing corn is cut and then conveyed to a suitable binder and bound "on end." In the field the stalks of corn will be found to occupy all sorts of positions, some standing quite erect and others leaning in different directions, and in operating a machine such as shown in said patent much difficulty is experienced in gathering the promiscuously-arranged stalks and properly presenting them to the cutter and thereafter conveying them in upright position to the binder. I find in practice that for the production of good results the stalks of corn should be brought into upright position by the time that they are presented to the cutter, and that thereafter the severed stalks should be conveyed in such upright position to the binder, and in my application for Letters Patent, Serial No. 619,959, means are provided for carrying out this result. In said application rapidly-moving corn-engaging devices are shown for "righting" the leaning stalks to present them to the cutter in upright position, and slowly-moving corn-engaging devices are shown at the rear of said rapidly-moving corn-engaging devices which engage the stalks, and by working in conjunction with suitable butt-feeding devices convey said upright stalks along the corn-passage to the binder. The butt-feeding devices engage the butts just in front of the cutter and hold them as the cutter operates, and, working in conjunction with said corn-engaging devices, feed rearward the severed stalks, and to prevent pulling up the corn in front of the cutter said butt-feeding devices work at a speed substantially equal to the speed at which the machine advances. The speed of the butt-feeding devices is thus limited to substantially the speed of the machine, and consequently the speed of the slowly-moving corn-engaging devices is likewise limited to substantially the speed of the machine. This invention has for its object to improve and simplify the construction of the mechanism employed for thus speedily righting the stalks in front of the cutter to present them to the cutter in upright position and for thereafter conveying them in such upright position to the binder.

The invention is embodied in a corn-harvester having a laterally-confined passage-way for the corn, a binder at the rear, and a cutter crossing said passage-way, a rapidly-moving corn-engaging device working in advance of the cutter and also at the rear of the cutter, which engages and "rights" the stalks preparatory to presenting them to the cutter, and thereafter serves as a stalk or upper feeding device to assist in conveying the severed corn to the binder, a butt-engaging device which engages the butts in front of the cutter and holds them as the cutter operates, and means for operating said butt-engaging device substantially at the speed of the machine, and a butt-feeding device which engages the butts of the severed corn just back of the cutter and which works in conjunction with said stalk or upper feeding device in conveying the severed corn along the corn-passage toward or to the binder, said butt-feeding device working rapidly, substantially at the same speed as said stalk or upper feeding device. The rapidly-moving butt-feeding device will engage the severed corn which may be delivered to it by the more slowly moving butt-engaging device in front of it.

Figure 2:
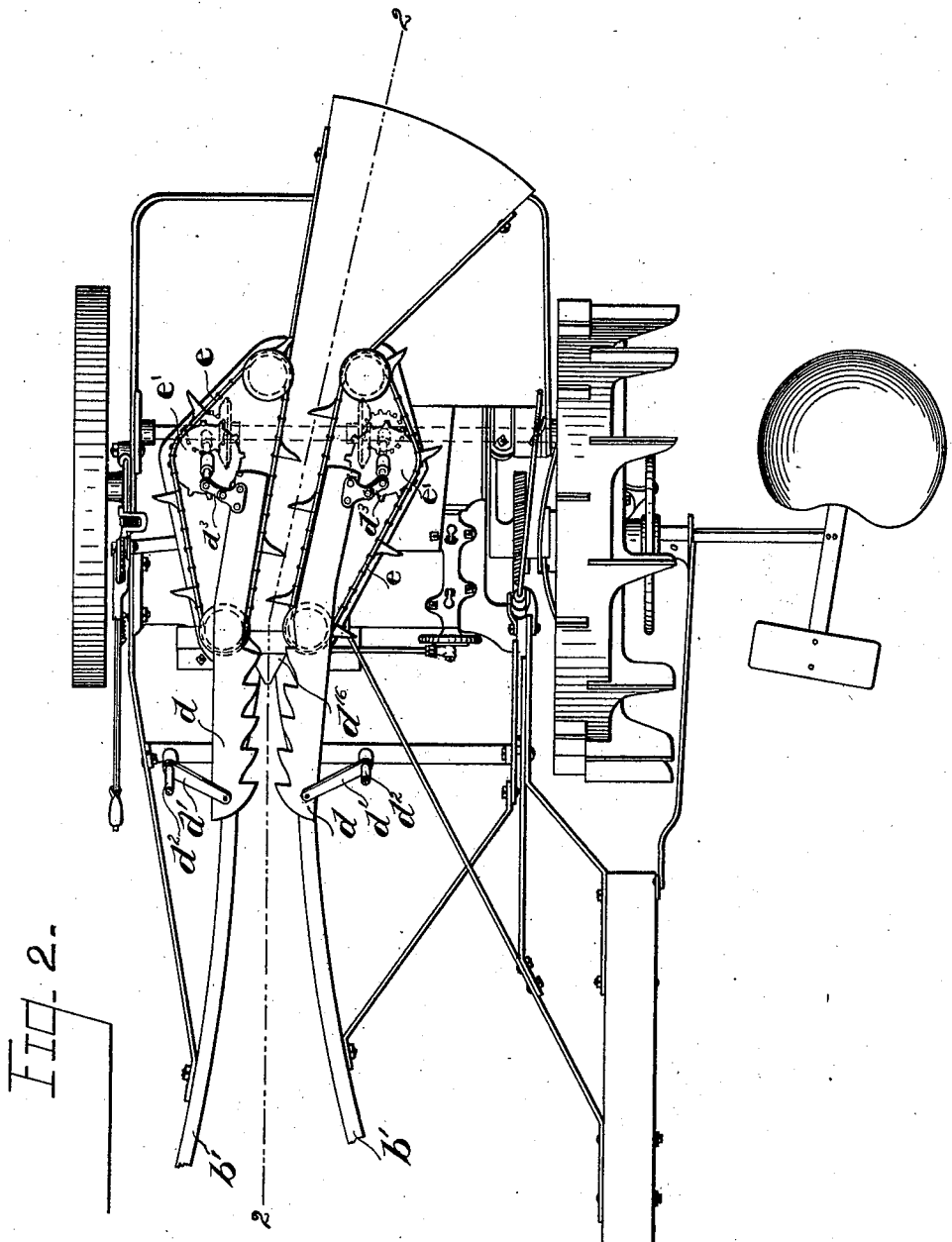

Figure 1 shows a longitudinal vertical section of a corn-harvester embodying this invention, taken on the dotted line 2 2, Fig. 2; Fig. 2, a horizontal section of the corn-harvester shown in Fig. 1, taken on the dotted line 1 1.

The gathering-arms each consist, essentially, of an upwardly-inclined portion $a$ and a lower horizontal base portion $b'$, and they are constructed and arranged to provide a passage-way between them for the corn, which extends from the front end of the machine rearwardly to a binding mechanism A, which may be of any suitable or usual construction. A cutter $d^{16}$, also of any suitable construction, is arranged at a point substantially midway the length of said corn-passage, and is movable back and forth across said passage to sever the corn.

c represents a corn righting and feeding device, which is herein shown as made as a sprocket-chain having laterally-projecting fingers, and said chain extends from the front to the rear of the passage-way, or substantially so, and is upwardly inclined substantially in parallelism with said upwardly-inclined portion $a$. There will be two of these righting and feeding chains $c$, located one at each side of the passage-way.

The corn righting and feeding chains $c$ are driven by sprocket-wheels secured to the upper ends of shafts $c'$, to the lower ends of which beveled gears $c^2$ are secured, which are engaged and driven by beveled gears $c^3$ on the main driving-shaft of the machine, and the driving mechanism for said corn righting and feeding device $c$ is so proportioned that said chains will be moved quite rapidly, the speed being considerably greater than the speed at which the machine advances. These devices $c$ extend from the front toward or to the rear of the passage-way and work along in front of and also at the rear of the cutter, which is located substantially midway the length of said passage-way, and in front of said cutter they act to raise the leaning stalks of corn and bring them into upright position before or by the time that they are presented to the cutter, and hence have the function of righting the stalks in front of the cutter, and at the rear of said cutter they assist in feeding rearward the severed stalks toward or to the binder. I desire it to be understood, however, that instead of employing rapidly-moving chains as a corn righting and feeding device to right the corn in front of the cutter and then assist in feeding the severed corn along the passage-way at the rear thereof I may employ any other form or construction of device capable of producing the results specified, and all such forms or constructions when working or moving at a speed considerably greater than the speed of the machine come within the scope of this invention.

$d$ represents jaws located in proximity to the cutter $d^{16}$, one at each side of the passage-way, and provided or formed with teeth on their adjacent edges, and said jaws project a short distance in advance of the cutter, so as to engage the butts of the corn in advance of the cutter to hold them and positively present them to the cutter. The jaws $d$ $d$ are connected at their forward ends by links $d'$ to posts or uprights $d^2$, and they are connected at their rear ends to crank-arms $d^3$, secured to the upright shafts $c'$, and as said shafts $c'$ rotate said jaws will be moved toward each other to engage the butts, then rearwardly along the corn-passage to present the same to the cutter and hold them while the cutter operates to sever the stalks, then away from each other to disengage the severed stalks, and then returned to their normal position. The motion thus described as given to said jaws is substantially a four motion, but their action is very positive. The operating devices for said jaws are arranged to move them rearward at substantially the speed of the machine, so as to prevent them from pulling up the corn in front of the cutter when brought into engagement therewith and serving to present them to the cutter. These jaws constitute and serve as a butt-engaging device, and while I prefer to employ as a butt-engaging device jaws, substantially as described, for the reason that they act positively to engage and hold the butts, yet I desire to include within the spirit and scope of this invention any other form or construction of butt-engaging device which engages the butts just in front of the cutter and presents them to the cutter and moves substantially at the speed of the machine. At the rear of said butt-engaging device a rearwardly moving or working butt-feeding device is provided, consisting, as herein shown, of a pair of sprocket-chains $e$, having laterally-projecting fingers like the corn righting and feeding chains before described, and said butt-feeding chains are located one at each side of the passage-way and extend from a point in front of the rear end of said butt-engaging device rearwardly toward or to the binder, and said feeding-chains are inclined upwardly substantially in parallelism with the corn righting and feeding chains located above them. The butt-feeding chains $e$ are driven by sprocket-wheels $e'$, secured to said upright shafts $c'$, and the parts are so proportioned that said chains move quite rapidly at a speed substantially equal to the speed of the upper corn righting and feeding device, and they operate to engage the butts of the severed corn as delivered to them by the butt-engaging device and to feed the corn along, in conjunction with the corn-feeding device, toward or to the binder. In lieu of this particular form of butt-feeding device it is obvious that so far as this invention is concerned any other suitable form or construction of butt-feeding device may be employed.

It will be seen that the corn righting and feeding device moves or works rapidly at a speed considerably greater than the speed of the machine and acts to right the corn in front of the cutter, and also assists in feeding the corn along the passage-way at the rear of the cutter, and that the butts are engaged by a device which moves or works at substantially the speed of the machine, and by said device they are presented to the cutter without pulling up the corn in front of the cutter, and that the severed stalks are then delivered to a rapidly moving or working butt-feeding device, which, in conjunction with the corn-feeding device, acts to feed the same rearwardly toward or to the binder.

I claim—

1. In a corn-harvester, a laterally-confined corn-passage, a cutter, a butt-engaging device located in proximity to the cutter which engages the corn in front of said cutter and holds it while the cutter severs it, and means for operating said butt-engaging device at a speed substantially equal to the speed of the machine, combined with a rapidly-moving corn-engaging device working rearwardly along said corn-passage from front to rear, to "right" the stalks in front of the cutter, and thereafter assist in feeding them along in upright position, a butt-feeding device at the rear of said butt-engaging device, and means for operating it at a speed substantially equal to the speed of said corn-engaging device, in conjunction with which it works in feeding the severed corn along, substantially as described.

2. In a corn-harvester, a laterally-confined passage-way, a cutter, a rapidly-working corn righting and feeding device, which rights the corn in front of the cutter, and assists in feeding the severed corn rearward, rapidly-working butt-feeding devices at the rear of the cutter which work in conjunction with said corn-feeding device, and at substantially the same speed, and a butt-engaging device which engages the corn in front of the cutter and holds it as the cutter operates, and means for operating said butt-engaging device at substantially the speed of the machine, substantially as described.

3. In a corn-harvester, a laterally-confined passage-way, a cutter crossing it substantially midway its length, and a binder at its rear end, a rapidly-moving corn righting and feeding device working substantially from end to end of said passage-way, which rights the corn in front of said cutter and feeds along the severed corn at the rear thereof, a slowly-moving butt-engaging device which engages the butts in front of and presents them to the cutter, and a rapidly-moving butt-feeding device at the rear of said butt-engaging device, which works in conjunction with said corn-engaging device in feeding the severed corn toward or to the binder, substantially as described.

4. In a corn-harvester, a cutter, a butt-engaging device which engages the butts in front of and presents them to the cutter, means for operating said butt-engaging device substantially at the speed of the machine, and a butt-feeding device at the rear of said butt-engaging device which moves rearward more rapidly, substantially as described.

5. In a corn-harvester, the combination of a cutter, a butt-engaging device which engages the butts in front of and presents them to the cutter, means for operating it substantially at the speed of the machine, a rapidly-moving butt-feeding device at the rear of said cutter, and a rapidly-moving corn righting and feeding device working in advance of the cutter to right the corn and at the rear of the cutter to feed the severed corn along, substantially as described.

In testimony whereof I have signed my name to this specification in the presence of two subscribing witnesses.

CHARLES S. SHARP.

Witnesses:
ROBT. G. BROCKWAY,
F. M. EVERITT.